United States Patent
Lingappa

(10) Patent No.: US 10,592,899 B2
(45) Date of Patent: Mar. 17, 2020

(54) MASTER APPLET FOR SECURE REMOTE PAYMENT PROCESSING

(71) Applicant: Visa International Service Association, San Francisco, CA (US)

(72) Inventor: Phaneendra Ramaseshu Lingappa, Dublin, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 976 days.

(21) Appl. No.: 14/711,615

(22) Filed: May 13, 2015

(65) Prior Publication Data

US 2015/0332262 A1    Nov. 19, 2015

Related U.S. Application Data

(60) Provisional application No. 61/992,880, filed on May 13, 2014.

(51) Int. Cl.
*G06Q 20/38* (2012.01)

(52) U.S. Cl.
CPC ... *G06Q 20/3829* (2013.01); *G06Q 20/38215* (2013.01)

(58) Field of Classification Search
CPC .................................................. G06Q 20/3829
See application file for complete search history.

(56) References Cited

U.S. PATENT DOCUMENTS 5,781,632 A    7/1998 Odom
5,870,723 A    2/1999 Pare, Jr. et al.
(Continued)

FOREIGN PATENT DOCUMENTS

KR    1020140055429    5/2014
WO    2014087163    6/2014

OTHER PUBLICATIONS

PCT International Search Report in connection with PCT Application No. PCT/US2015/030623 dated Jul. 29, 2015, 15 pages.
(Continued)

*Primary Examiner* — Jacob C. Coppola
(74) *Attorney, Agent, or Firm* — Kilpatrick Townsend & Stockton LLP

(57) ABSTRACT

Embodiments of the invention are directed to methods, apparatuses, and systems for processing transactions using a master applet on a mobile device. One embodiment of the invention is directed to a method comprising a master applet associated with a mobile application of a mobile device determining available applications on a mobile device, displaying the available applications to a user, and receiving a selection of one of the available applications from the user. The method further comprises obtaining encrypted credentials from the selected application, generating an encrypted payload including the encrypted credentials and transaction data using a master applet encryption key associated with the applet, and sending the encrypted payload to a processor computer. The processor computer decrypts the encrypted payload using a master applet decryption key, decrypts the encrypted credentials using a selected application decryption key, and uses the decrypted credentials and transaction data to initiate a transaction.

12 Claims, 6 Drawing Sheets

(56) References Cited

U.S. PATENT DOCUMENTS

| | | | |
|---|---|---|---|
| 7,499,889 B2 | 3/2009 | Golan et al. | |
| 7,565,329 B2 | 7/2009 | Lapsley et al. | |
| 7,596,530 B1 | 9/2009 | Glasberg | |
| 8,430,325 B2 * | 4/2013 | Jain | G06Q 20/3278 235/492 |
| 8,925,053 B1 | 12/2014 | Mehta | |
| 9,576,286 B1 | 2/2017 | Artman et al. | |
| 9,767,457 B1 | 9/2017 | Ford et al. | |
| 9,805,370 B1 | 10/2017 | Quigley et al. | |
| 2002/0069165 A1 | 6/2002 | O'Neil | |
| 2007/0162760 A1 * | 7/2007 | Samuelsson | G06F 21/6227 713/182 |
| 2008/0121687 A1 * | 5/2008 | Buhot | G06Q 20/32 235/375 |
| 2009/0094123 A1 | 4/2009 | Killian et al. | |
| 2009/0215489 A1 * | 8/2009 | Kerdraon | H04M 1/72522 455/558 |
| 2012/0030044 A1 | 2/2012 | Hurst | |
| 2012/0166333 A1 | 6/2012 | Von Behren et al. | |
| 2012/0191569 A1 | 7/2012 | Shah | |
| 2012/0310832 A1 | 12/2012 | Hammad et al. | |
| 2013/0013499 A1 | 1/2013 | Kalgi | |
| 2013/0191227 A1 * | 7/2013 | Pasa | G06Q 20/3674 705/14.73 |
| 2013/0212660 A1 * | 8/2013 | Neafsey | G06Q 20/3821 726/6 |
| 2013/0232083 A1 * | 9/2013 | Smith | G06Q 20/3278 705/67 |
| 2013/0297509 A1 * | 11/2013 | Sebastian | G06Q 20/3226 705/44 |
| 2014/0058937 A1 * | 2/2014 | Watson | G06Q 20/204 705/41 |
| 2014/0101042 A1 | 4/2014 | Grissom et al. | |
| 2014/0129438 A1 * | 5/2014 | Desai | G06Q 20/3829 705/41 |
| 2014/0173686 A1 | 6/2014 | Kgil et al. | |
| 2014/0244504 A1 | 8/2014 | Owen | |
| 2015/0019443 A1 * | 1/2015 | Sheets | G06Q 20/3278 705/71 |
| 2015/0052064 A1 | 2/2015 | Karpenko et al. | |
| 2015/0095238 A1 * | 4/2015 | Khan | G06Q 20/325 705/71 |
| 2015/0112860 A1 * | 4/2015 | Wang | G06Q 20/322 705/39 |
| 2016/0086155 A1 | 3/2016 | Candelore et al. | |
| 2017/0091765 A1 | 3/2017 | Lloyd et al. | |

OTHER PUBLICATIONS

Supplementary European Search Report for European Patent Application No. 15792244.4-1217 dated Jan. 3, 2018, 8 pages.
U.S. Appl. No. 15/381,000, "Notice of Allowance", dated Sep. 3, 2019, 20 pages.
U.S. Appl. No. 15/381,000, "Final Office Action", dated May 14, 2019, 23 pages.
U.S. Appl. No. 15/381,000, "Non-Final Office Action", dated Nov. 1, 2018, 21 pages.

* cited by examiner

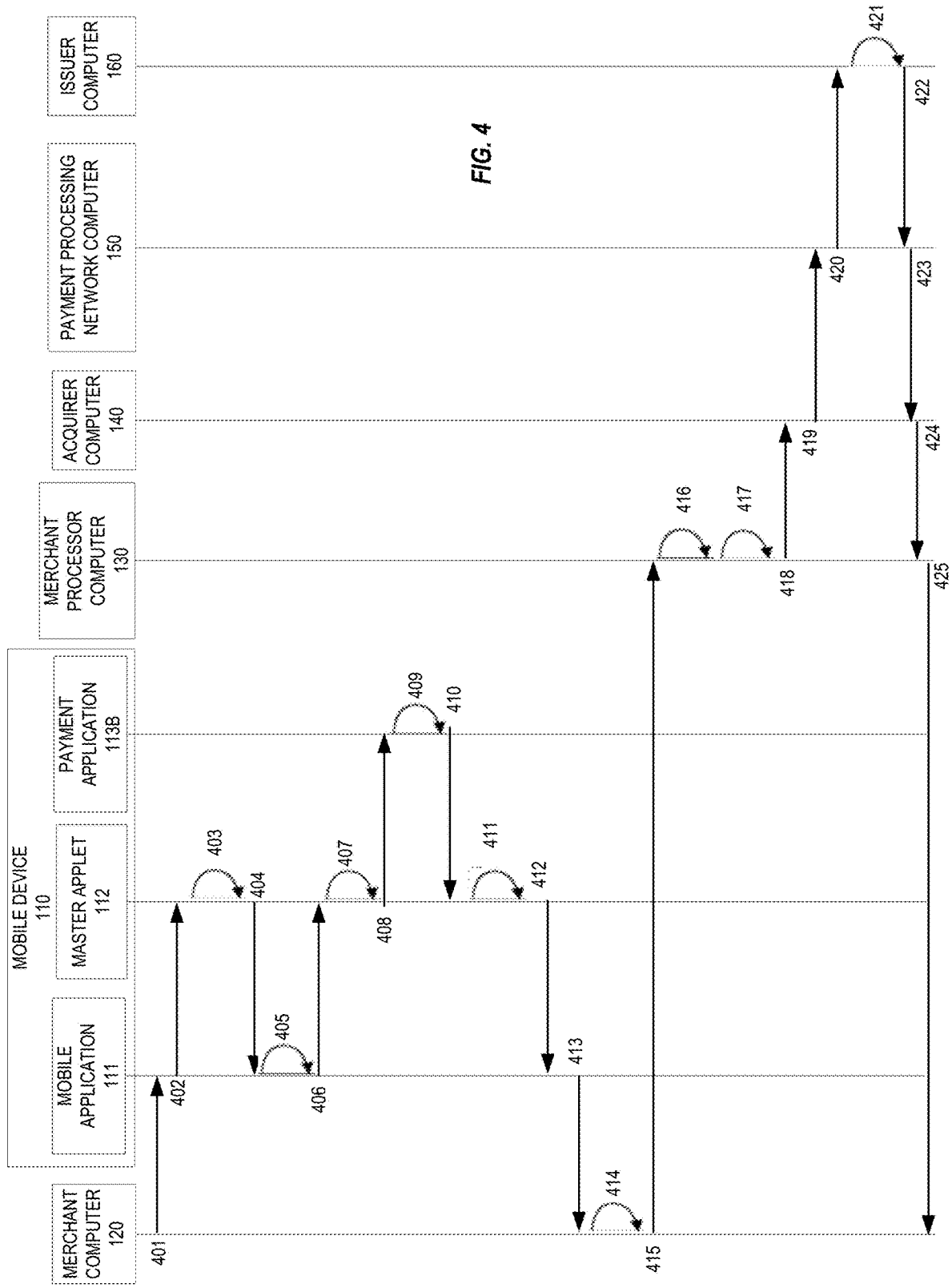

MASTER APPLET FOR SECURE REMOTE PAYMENT PROCESSING

CROSS-REFERENCES TO RELATED APPLICATIONS

This application claims the benefit of priority to and is a Non-Provisional Applications of U.S. Provisional Application No. 61/992,880, filed on May 13, 2014, which is hereby incorporated by reference in its entirety for all purposes.

BACKGROUND

Mobile payment environments (e.g., a mobile communication device) may have a number of different mobile wallets including a number of different payment methods and credentials. However, it may be difficult for a merchant to integrate multiple payment applications into a mobile application experience. For example, it may be difficult for a merchant to configure and design a mobile application to accept mobile payments from the variety of different digital wallets that are available to consumers because each digital wallet may have different security practices, communication protocols, and integration requirements. Furthermore, some mobile communication devices may have a designated wallet set as a default for payments, but this may not give users the flexibility and options they desire to select a particular payment application and experience for each transaction. Accordingly, there is a need for a single party and/or application interface to facilitate and control the various payment options that may be available in a mobile payment environment.

For example, mobile devices can have many wallet applications installed, each of which may have its own specific requirements for integrating with mobile applications as well as processing transactions. It is unduly burdensome to require application developers to design interfaces for each and every possible wallet application that can be installed on a device. Further, using a patchwork of different wallet application payment processing methods may raise the chance of security lapses by one of the wallet applications.

Embodiments of the present invention solve these problems and other problems, individually and collectively.

SUMMARY

One embodiment of the invention is directed to a method. The method comprises a master applet associated with a mobile application determining available applications on a mobile device, displaying the available applications to a user, and receiving a selection of one of the available applications from the user. The method further comprises obtaining encrypted credentials from the selected application, generating an encrypted payload including the encrypted credentials and transaction data using a master applet encryption key associated with the applet, and sending the encrypted payload to a processor computer. The processor computer decrypts the encrypted payload using a master applet decryption key, decrypts the encrypted credentials using a selected application decryption key, and uses the decrypted credentials and transaction data to initiate a transaction.

Another embodiment is directed to a method. The method comprises a computer receiving an encrypted payload from a master applet operating on a mobile device. The encrypted payload including encrypted credentials and transaction data. The method further comprises decrypting the encrypted payload using a decryption key associated with the master applet to obtain the encrypted credentials and transaction data. The method further comprises determining a decryption key associated with the encrypted credentials, decrypting the encrypted credentials using the decryption key, and initiating a transaction using the decrypted credentials and transaction data.

Another embodiment is directed to a system. The system comprises a mobile device including a master applet associated with a mobile application and a computer. The master applet is configured to determine available applications on a mobile device, display the available applications to a user, receive a selection of one of the available applications from the user, obtain encrypted credentials from the selected application, generate an encrypted payload including the encrypted credentials and transaction data, and send the encrypted payload to a computer. The payload is encrypted using a master applet encryption key. The computer is configured to receive the encrypted payload including the encrypted credentials and the transaction data, decrypt the encrypted payload using a decryption key associated with the master applet to obtain the encrypted credentials and transaction data, determine a decryption key associated with the encrypted credentials, decrypt the encrypted credentials using the decryption key associated with the encrypted credentials, and initiate a transaction using the decrypted credentials and the transaction data.

These and other embodiments are described in further detail below.

BRIEF DESCRIPTION OF THE DRAWINGS

FIG. 4 shows an exemplary flow diagram for an exemplary payment processing transaction using the master applet transaction process, according to embodiments of the present invention.

TERMS

Figure 1:
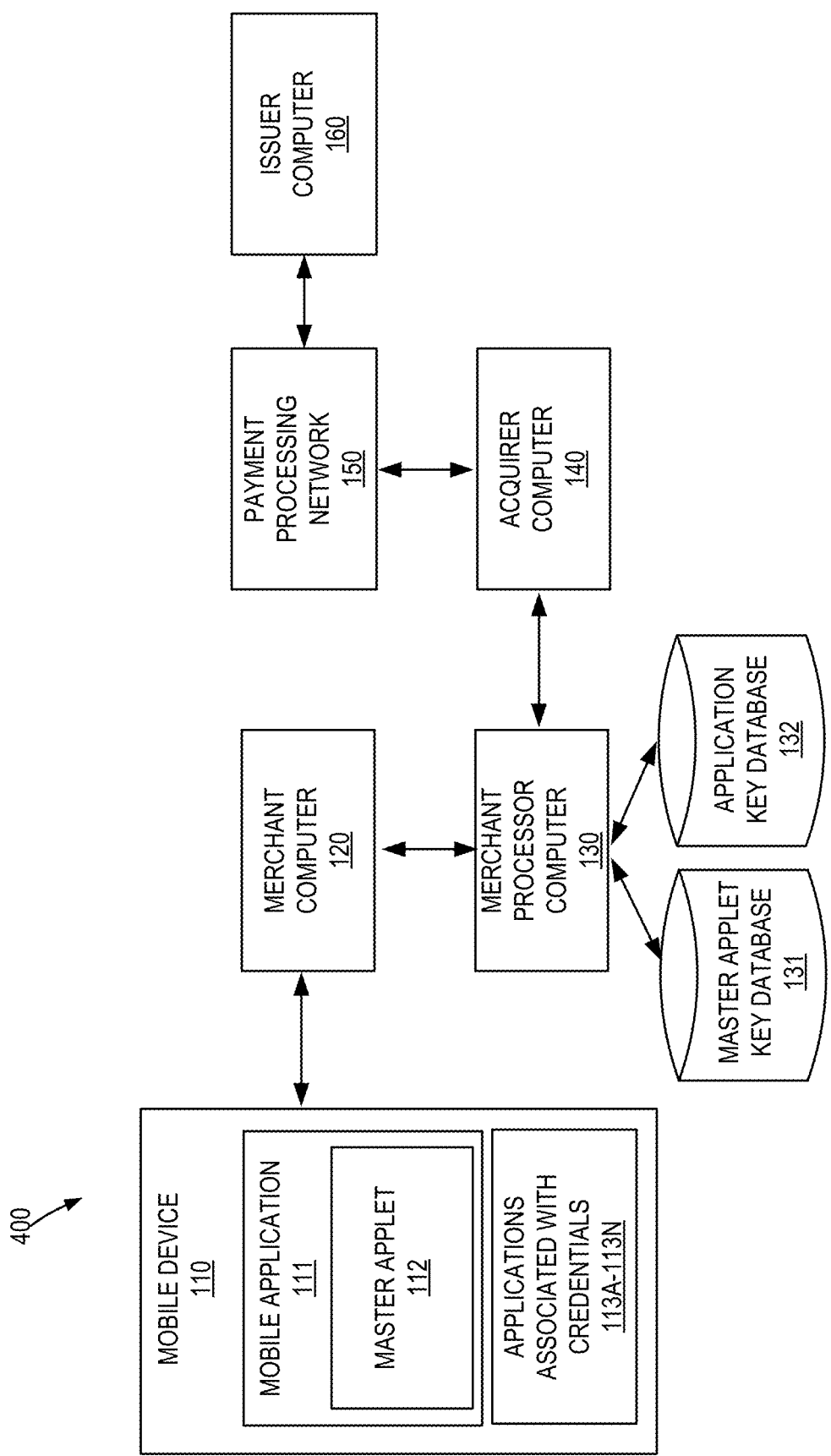
FIG. 1 shows a block diagram of a transaction processing system including a master applet, according to an exemplary embodiment of the present invention.

Before discussing specific embodiments and examples, some descriptions of terms used herein are provided below.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application.

A "payment application" or "wallet application" may store credentials (e.g., account identifier, expiration date, card verification value (CVV), etc.) for accounts provisioned onto the mobile device. The account credentials may be stored in general memory on the mobile device or on a secure trusted execution environment (e.g., a secure element) of the mobile device. Further, in some embodiments, the account credentials may be stored by a remote computer and the payment/wallet application may retrieve the credentials (or a portion thereof) from the remote computer before/during a transaction. Any number of different commands or communication protocols may be used to interface with the payment application and/or wallet application in order to obtain and use stored credentials associated with each application.

The payment application or wallet application may be configured to provide credentials to an authorized software application or module on a mobile device. For example, a payment application may be configured to interface with a master applet in order to provide credentials to a mobile application for a transaction. For instance, the payment application may provide a software development kit (SDK) or application programming interface (API) that the master wallet applet may use to interface with the payment application and/or wallet application. The payment application and/or wallet application may be configured to provide the sensitive information in encrypted form using stored encryption keys. Thus, each payment application and/or wallet application may have different commands and/or instructions for accessing the associated credentials stored by the payment/wallet application. For instance, each payment application and/or wallet application may have a different application program interface (API) with different commands, data requirements, authentication processes, etc., for interacting with other applications operating on the mobile device. Accordingly, a master wallet applet may include a number of different APIs, one for each of the different payment applications and/or wallet applications that the master wallet applet is configured to interface with.

"Credentials" may include any information that identifies and/or validates the authenticity of a particular entity, article, access right, and/or item. For example, "account credentials" may include any information that identifies an account and allows a processor to verify that a device, person, or entity has permission to access the account. For example, account credentials may include an account identifier (e.g., a PAN), a token (e.g., account identifier substitute), an expiration date, a cryptogram, a verification value (e.g., card verification value (CVV)), personal information associated with an account (e.g., address, etc.), an account alias, or any combination thereof. Account credentials may be static or dynamic such that they change over time. Further, in some embodiments, the account credentials may include information that is both static and dynamic. For example, an account identifier and expiration date may be static but a cryptogram may be dynamic and change for each transaction. Further, in some embodiments, some or all of the account credentials may be stored in a secure memory of a mobile device. The secure memory of the mobile device may be configured such that the data stored in the secure memory may not be directly accessible by outside applications and a payment application associated with the secure memory may be accessed to obtain the credentials stored on the secure memory. Accordingly, a mobile application may interface with a payment application in order to gain access to payment credentials stored on the secure memory.

"Encrypted credentials" may include credentials which have been made unintelligible using a cryptographic key. In some embodiments, encrypted credentials may be generated by a payment application and/or wallet application of a mobile device using encryption keys (e.g., application public keys) that are used to encrypt stored or received credentials and/or other transaction information for a transaction. For example, a payment application may store a public encryption key (i.e., application public key) that may be paired with a private encryption key (i.e., application private key) that may be securely stored at a merchant processor computer or other secure transaction processor system configured to process a remote payment transaction. The application private key may be used to decrypt the encrypted credentials and process a transaction using the decrypted account credentials. Additionally, in some embodiments, the application encryption key may include a symmetric encryption key, and thus the keys are not limited to public/private key pairs.

"Decrypted credentials" may include credentials that have been converted from an unintelligible state to an understandable state. For example, decrypted credentials may include the result of applying an application-specific decryption key to encrypted credentials received at a merchant processor computer to obtain the original comprehendible credentials in the clear. Thus, by storing and sending account credentials as encrypted credentials, and decrypting the account credentials at a merchant processor computer, the account credential are protected from interception by a malicious third party.

A "merchant application" may include any application associated with a relying party to a transaction. For example, a merchant application may be associated with a particular merchant or may be associated with a number of different merchants and may be capable of identifying a particular merchant (or multiple merchants) which are a party to a transaction. For instance, the merchant application may store information identifying a particular merchant server computer that is configured to provide a sales environment in which the merchant server computer is capable of processing remote transactions initiated by the merchant application. Further, the merchant application may also include a general purpose browser or other software designed to interact with multiple merchant server computers as long as the browser is configured to identify the merchant server computer and process a remote transaction. The merchant application may be installed on general purpose memory of a mobile device and thus, may be susceptible to malicious attacks, cracks, etc. Accordingly, the merchant application may be treated as an untrusted or unknown application by some payment and/or wallet application within the mobile device.

An "applet" may include any application that performs a small number of tasks within the scope of a larger program. For example, a mobile application may comprise a master applet which is configured to interface with multiple applications on a mobile device. Further, in some embodiments, the master applet may include a master wallet applet which is configured to interface with multiple wallet applications on a mobile device in order to process a transaction using one of the wallet applications.

A "master applet" may include any application or applet that is configured to interface and obtain information from other applications. For example, a "master wallet applet" may be configured to interface with multiple payment/wallet applications to obtain credentials during a transaction. The master applet may be a part of a larger mobile application or merchant application that is configured to perform a remote transaction through a mobile device. For instance, the master applet may include a software development kit (SDK) or application program interface (API) that can be easily incorporated into mobile applications being developed for a mobile device.

A "payload" may include a portion of a data transmission that includes the "cargo" or the data that is intended to be sent for the transmission. For instance, a data transmission may include information to facilitate transmission of a message (e.g., headers, metadata, other overhead data, etc.) and the message itself (i.e., the payload). In some embodiments, information that may be used to identify the type of payload, the content of the payload, and/or an encryption/decryption key associated with the payload may be included in a header or in other metadata associated with the message.

Further, in some embodiments, a payload may be encrypted by one party using an encryption key, the encrypted payload may be transmitted to another party over a communication network, and the encrypted payload may be decrypted by the other party using registered decryption keys associated with the first party. Thus, sensitive information within the payload may be protected from malicious third parties during transmission. As such, an "encrypted payload" may include a data transmission where the data message has been made unintelligible to unauthorized parties to prevent unauthorized access to information within the payload. For example, information within the encrypted payload may not be read by a recipient without access to a shared secret or access to a designated encryption/decryption key. As such, the encrypted payload may be made unintelligible through a process that is reversible and repeatable such that two entities can share information using a shared secret or encryption keys without unauthorized entities being able to understand or gain access to any sensitive information or sensitive credentials within the payload (unless they gain access to the shared secret or encryption keys).

Additionally, in some embodiments, the encrypted payload may include any combination of encrypted sensitive information and unencrypted less sensitive or non-secure information. For example, in some embodiments, the encrypted payload may include encrypted account credentials (e.g., sensitive account identifiers and expiration date) and unencrypted transaction information (e.g., transaction amount, product identifiers, etc.) and/or transaction facilitation information (e.g., a master applet identifier included in the data transmission to indicate the type of transaction). In other embodiments, the encrypted payload may include all of the relevant transaction information encrypted. For instance, in some embodiments, the encrypted payload may include both encrypted account credentials and encrypted transaction information.

A "decrypted payload" may include a data message of a data transmission that has been converted from an unintelligible state to an understandable state. For example, a decrypted payload may include the result of applying a decryption key to an encrypted payload to obtain the original comprehensible payload in the clear. For instance, a master applet private key may be applied to an encrypted payload that was encrypted with a master applet public key in order to decrypt the encrypted payload and obtain the underlying information within the payload. Further, where the encrypted payload includes both encrypted and unencrypted information, the decrypted payload may be obtained by decrypting the encrypted portions while not decrypting the unencrypted portions.

As used herein, "transaction data" may include any information associated with an interaction between two or more parties. For example, transaction information may include a transaction amount, transaction time, transaction date, merchant information (e.g., a registered merchant identifier, merchant address, merchant computer network address, etc.), product information (e.g., serial numbers, product names or other identifiers, etc.). The transaction information may be provided to a mobile device by a merchant computer before or after the consumer initiates a remote transaction through a mobile application associated with the merchant computer. In some embodiments, the transaction information may be used to identify a specific merchant associated with a transaction using a merchant identifier or a mobile application identifier included in the transaction information.

A "key" may include any information that determines the functional output of a cryptographic algorithm. For example, an "encryption key" specifies a particular transformation of plaintext into ciphertext (i.e., obfuscated or unintelligible data). Similarly, a "decryption key" specifies a particular transformation of ciphertext into plaintext. In some embodiments, the encryption key and decryption key may be the same key (i.e., in a symmetric key encryption scheme). Alternatively and/or additionally, an encryption key and decryption key may include a public/private key pair where the encryption key is a public key and the decryption key is a private key.

A "public/private key pair" may include a pair of linked cryptographic keys generated by an entity. The public key may be used for public functions such as encrypting a message to send to the entity. The private key, on the other hand may be used for private functions such as decrypting a received message. The public key will usually be authorized by a body known as a certification authority (i.e., certificate authority) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss.

A "public key" may include any encryption key that may be shared openly and publicly. The public key may be designed to be shared and may be configured such that any information encrypted with the public key may only be decrypted using a private key associated with the public key (i.e., a public/private key pair).

A "private key" may include any encryption key that may be protected and secure. For example, the private key may be securely stored at an entity that generates a public/private key pair and may be used to decrypt any information that has been encrypted with the associated public key of the public/private key pair.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

DETAILED DESCRIPTION

Embodiments of the invention are directed to methods and systems for processing mobile payments using a master applet that interfaces with multiple payment applications and/or wallet applications installed on a mobile device to allow a consumer to choose between any number of different payment methods, accounts, and/or authentication processes while still providing a secure transaction environment.

For example, embodiments are directed at a master wallet applet that allows merchant application developers to securely integrate any mobile wallets/payment applications available on a device using a single interface. The system passes encrypted payment credentials from a selected installed wallet application of a device through a merchant server computer to a single integration platform (e.g., a merchant processor computer), which uses pre-registered decryption keys associated with the selected wallet application to decrypt and process a transaction for any of the available wallets on a device.

In some mobile payment ecosystems, users may initiate a remote payment transaction using mobile applications installed on their mobile devices (e.g., mobile phones) that are configured to communicate with remote merchant server computers. Accordingly, a mobile application may obtain account credentials stored on their phone from a wallet or payment application that stores the credentials and controls access to the credentials on the phone. The mobile application may obtain the stored payment credentials by accessing the payment credentials from one of a variety of wallet applications installed on a device. Thereafter, the mobile application may initiate a payment processing request or authorization request that may be sent to the merchant web server for passing onto a payment processing network.

However, users may have a number of different mobile wallets installed on their phones and current systems are not flexible enough to allow a consumer to choose from a number of different payment methods in order to process a transaction because each merchant requires integration with each particular wallet application in order to accept payment through that wallet application. Each wallet may have its own payment experience, accepted payment formats, encryption keys, on-boarding processes, communication protocols, and security procedures that may change drastically between wallet applications.

Further, each wallet or payment application may have different instructions, commands, requirements, authentication processes, etc., for interfacing with the various wallet applications on the mobile device that make integrating with multiple different wallets difficult for mobile application developers. As such, phones may only allow the selection of a single "default" wallet to be used in a transaction and may not allow for selection from a variety of wallet applications installed on the device. For example, some current mobile phone systems require a user to preselect a default wallet for their device to be used for any given transaction and may not allow for multiple different payment options to be presented to a user during a transaction.

Accordingly, embodiments of the present invention may be directed at a master wallet applet that allows a mobile application developer to easily and efficiently provide consumers a number of different payment processing options and securely process transactions initiated through a variety of different payment applications. Further, embodiments of the present invention provide an easy to implement master wallet applet software development kit (SDK) or application programming interface (API) that can easily be incorporated into a mobile application to easily and efficiently provide a variety of payment application options to a consumer, without requiring extensive development by an application developer.

Further, the master wallet applet interface may be provided by a merchant processor or other third party server that is already established within a payment processing ecosystem. Thus, the master wallet applet may easily be incorporated into existing payment flows by building on existing functionality already provided during payment transaction processing. For example, the master wallet applet may be developed and associated with a merchant processor which may include an entity that is already associated with a merchant's e-commerce transaction processing system. The merchant processor (e.g., CyberSource™) may sit between a merchant and an acquirer in a transaction processing system and may perform fraud checks and other transaction processing services before transactions are passed onto acquirers, payment processing networks, issuers, etc. Accordingly, by leveraging existing e-commerce transaction processing infrastructure, a master wallet applet may minimize technical integration complexities and streamline integration of a master wallet applet for processing secure remote transactions for a variety of different wallet applications.

I. Transaction Processing Systems Using a Master Applet

FIG. 1 shows a block diagram of an exemplary system 100 for performing a remote transaction using a master wallet applet associated with a mobile application 111 of a mobile device 110, according to some embodiments of the invention. The system 100 comprises a user (e.g., consumer) (not shown), a mobile device 110 including a mobile application 111, a master wallet applet 112 and payment/wallet applications associated with account credentials 113, a merchant computer 120, a merchant processor computer 130, an acquirer computer 140, a payment processing network 150, and an issuer computer 160. The various entities may be configured to communicate with one another over any suitable wireless or wired communication network and using any suitable communications protocol, including open or proprietary communications protocols. Before addressing the specifics of the remote transaction processing system using a master wallet applet, a traditional card present transaction processing system may be helpful.

A. Card Present Transaction Processing

In some card present (CP), face-to-face, or in-store payment transactions, the user purchases a good or service at a merchant location using a mobile device 110. For example, the user's mobile device 110 can interact with an access device (e.g., merchant point-of-sale device) (not shown)) at a merchant location (not shown). For instance, the user may tap the mobile device 110 against an near-field communication (NFC) reader of the access device. Alternately, in a remote or "card not present" (CNP) transaction, the user may indicate payment details to a merchant computer 120 electronically, such as in an online or "e-commerce" transaction.

In such transactions, an authorization request message may be generated by the mobile device 110 or the merchant computer 120 and then forwarded to the acquirer computer 140. After receiving the authorization request message, the authorization request message is then sent to the payment processing network 150. The payment processing network 150 then forwards the authorization request message to the corresponding issuer computer 160 associated with an issuer associated with the user.

An "authorization request message" may be an electronic message that is sent to a payment processing network 150 and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 160 receives the authorization request message, the issuer computer 160 sends an authorization response message back to the payment processing network 150 to indicate whether the current transaction is authorized (or not authorized). The payment processing network 150 then forwards the authorization response message back to the acquirer computer 140. In some embodiments, payment processing network 150 may decline the transaction even if issuer computer 160 has authorized the transaction, for example depending on a value of the fraud risk score. The acquirer computer 140 then sends the response message back to the merchant computer 120.

An "authorization response message" may be an electronic message reply to an authorization request message generated by an issuing financial institution 170 or a payment processing network 150. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network 150) to the merchant computer 120 that indicates approval of the transaction. The code may serve as proof of authorization. As noted above, in some embodiments, a payment processing network 150 may generate or forward the authorization response message to the merchant.

After the merchant computer 120 receives the authorization response message, the merchant computer 120 may then provide the authorization response message to the user. The response message may be displayed by the mobile device 110 or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 150. A clearing process is a process of exchanging financial details between an acquirer and an issuer to facilitate posting to a customer's payment account and reconciliation of the user's settlement position.

As used herein, an "issuer" may typically refer to a business entity (e.g., a bank) that maintains financial accounts for a user and often issues a portable consumer device such as a credit or debit card to the user. The issuer may also issue or provisioning account information to a mobile device 110 to allow for mobile payments initiated by a mobile device. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., merchant computer 120, acquirer computer 140, payment processing network 150, and issuer computer 160) to enable communications, or to perform one or more of the functions described herein.

The payment processing network 150 may include data processing subsystems, networks, and operations used to support and deliver certificate authority services, authorization services, exception file services, transaction scoring services, and clearing and settlement services. An exemplary payment processing network 150 may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 150 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 150 may use any suitable wired or wireless network, including the Internet.

B. Remote Transaction Processing System

A "remote transaction" may include any transaction where one party to a transaction is separated by some distance and/or by a device from another party to a transaction. For example, a remote transaction may include a "card-not present," electronic commerce, or other online transaction performed through communication between two or more devices. For instance, remote transactions may include devices that are not present in the same location or multiple devices where the two parties (e.g., a merchant and a consumer) are not using the same device to complete the transaction. Additionally, a remote transaction may include an in-store transaction that is not completed using a merchant point-of-sale device (i.e., access device) and instead is completed by a consumer using their mobile device 110 to communicate with a remote (or local) merchant server computer configured to process the remote transactions.

Traditionally, remote transactions have had a higher chance of fraud because remote transactions do not allow a payee (e.g., a merchant) the opportunity to identify the payer (e.g., consumer) or otherwise ensure that the payment they are receiving is legitimate, as the two parties are not present in the same location during the transaction (such as in a "card present" or in-store transaction). A local, card present, face-to-face, or in-store transaction may include a transaction where two or more parties to a transaction are present in the same location, use the same transaction device, or is performed through at least one present individual or entity to authenticate the identity of a payer and/or payee.

In the remote transaction processing system of FIG. 1, the mobile device 110 is configured to initiate and process a remote transaction with a merchant computer 120 using a mobile application 111, a master applet 112, and one of a plurality of associated applications with account credentials 113. A merchant processor computer 130 may be configured to receive an encrypted payload for the transaction from the merchant computer 120, may decrypt the encrypted payload, and may facilitate secure remote transaction processing using the decrypted payload.

A user (e.g., consumer 110) may operate a mobile device 110 to conduct remote payment transactions using a mobile application 111 that is configured to interact with a remote server computer associated with a merchant (i.e., a merchant computer 120). The merchant computer 120 may deliver available products and services to the mobile application 111 which the consumer 110 may use to initiate a remote transaction, whether located at a merchant location or remote from the merchant.

A "mobile device" may include any electronic computing device. For example, a mobile device 110 may include a mobile phone, tablet, netbook, laptop, or any other suitable mobile computing device. The mobile device 110 may comprise a mobile application 111 and a variety of applications associated with credentials 113A-113N (also referred to as "payment applications" and/or "wallet applications"). In some embodiments, the applications associated with credentials may be installed and executed from a secure memory or trusted execution environment (e.g., a secure element) of the mobile device 110. In other embodiments, the payment applications and/or wallet applications may be stored and executed from a general memory of the mobile device 110.

A mobile application 111 may include any software module including any executable code configured to allow a consumer to interact with a mobile application computer in order to initiate a remote transaction. In some embodiments, mobile application 111 may be a merchant-specific application that is developed by or on behalf of a particular merchant. In other embodiments, mobile application 111 may be a general purpose application, such as a web browser that may interact with many different mobile application computers. In some embodiments, the mobile application computer may also be referred to as a "merchant computer" and the mobile application 111 may be referred to as a "merchant application." However, the mobile application 111 is not limited to such and instead, the mobile application 111 may be associated with parties that are not merchants and instead process payments on behalf of merchants or other service providers (e.g., payment service providers, acquirers, etc.).

The applications associated with account credentials 113A-113N may include two or more software applications or other executable code configured to retrieve credentials (and/or other transaction information) and interface with the master applet 112 to provide the credentials to the mobile application 111 for a transaction. In some embodiments, the applications 113A-113N may be secured such that access to the applications is restricted to particular applications on the mobile device 110. Further, communications from the applications 113A-113N to any other applets or applications may be encrypted using an application-specific encryption key. For example, a wallet application 113A may be stored and executed by a secure element (not shown) or other trusted environment, as a kernel service, or at a higher permission level than mobile application 111 and an applet may be authenticated before allowing permission or access to the wallet application 113A. Thus, each of the two or more payment/wallet applications associated with account credentials 113A-113N may have access to a different encryption key to be used in encrypting information before being passed to other applications or applets. Further, note that there could be any number of applications 113A-113N installed or provisioned on the mobile device 110 and the element 113N indicates that there could be N different payment/wallet applications present on the mobile device 110.

Each of the applications 113A-113N may include an encryption key that has been registered and/or issued by a computer associated with the master applet 112 that allows for decryption of any information encrypted by the applications 113A-113N. For example, the applications may perform an encryption key registration process with a merchant processor computer 130 that is configured to facilitate transaction processing for transactions initiated using the master applet 112.

Additionally, in some embodiments, the applications 113A-113N may have access to a public key certificate associated with the merchant processor computer 130, which may be used to encrypt account credentials and other communications using a public key associated with the merchant processor computer 130 (which stores the associated private key for decrypting the encrypted account credentials).

Figure 2:
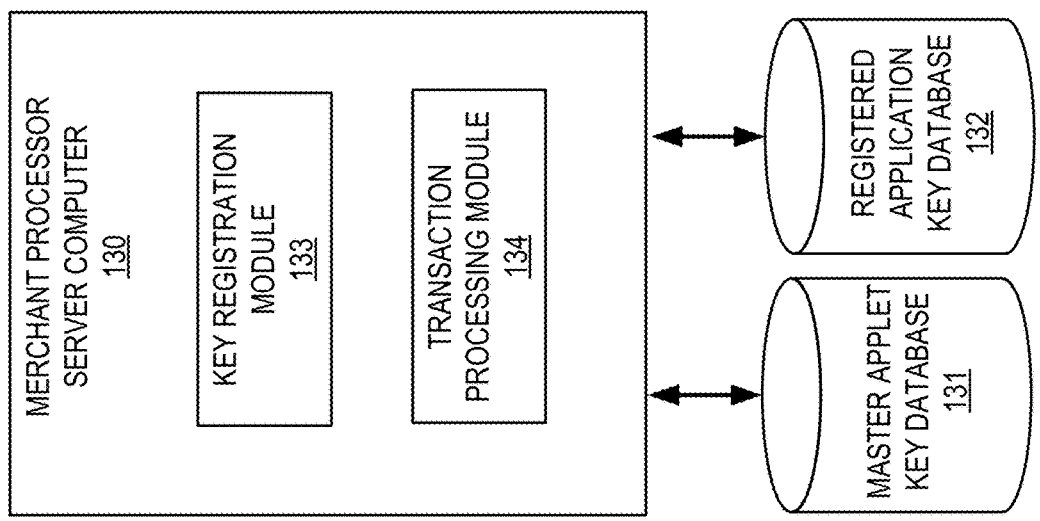
FIG. 2 shows a block diagram of an exemplary merchant processor computer, according to an exemplary embodiment of the present invention.

FIG. 2 shows a block diagram of an exemplary merchant processor computer 130, according to some embodiments of the invention. The merchant processor computer 130 may comprise a key registration module 133 and a transaction processing module 134 and may be electrically coupled to a master applet key database 131 and an registered application key database 132. The merchant processor server computer 130 may further comprise a processor (not shown) and a computer-readable medium (not shown) coupled to the processor, the computer-readable medium comprising code, executable by the processor, for performing methods described in embodiments herein.

The key registration module 133 may include any software module that is configured to communicate with a payment application developer computer (not shown) and/or wallet application developer computer (not shown) to register a payment/wallet application for use with the master applet 112. The key registration module 133 may be configured to receive a registration request from a payment/wallet application developer computer and issue an application identifier to the application developer for a payment/wallet application that can be used to identify an appropriate encryption/decryption key for transactions initiated using the payment/wallet application moving forward. The key registration module 133 may further be configured to generate an encryption key and a decryption key associated with the application associated with the application developer, store the decryption key in a registered payment/wallet application key database 132 as being associated with the payment/wallet application identifier, and send a registration response including the encryption key to the application developer to be included in the payment/wallet application that is provisioned on a mobile device 110. Further, in some embodiments, the key registration module 133 may provide a master encryption key to the payment/wallet application developer which may then generate derived keys associated with the master key for each of the mobile devices. Thus, the registered application key database 132 may include a single key for each payment/wallet application developer, different keys for each payment/wallet application developer, or a single master key for each developer that can be used to generate a derived key for each transaction decryption request.

The transaction processing module 134 may include any software module that is configured to process a payment request associated with a master applet 112 operating on a mobile device 110. The transaction processing module 134 may receive a transaction request from a merchant computer 120 that is associated with the merchant processor. The transaction request may include an encrypted payload and the transaction processing module 134 may be configured to determine a decryption key associated with the master applet 112 to decrypt the encrypted payload, determine a decryption key associated with encrypted credentials contained within the decrypted payload, and process a transaction using the decrypted information contained within the payload and the decrypted credentials. The transaction processing module 134 may also provide fraud analysis and reporting functionality to the merchant for e-commerce transactions.

The master applet key database 131 may comprise one or more decryption keys associated with one or more master applets. For example, in one embodiment, the master applet key database 131 may comprise one or more private keys associated with a registered private/public key pair. The private key may be generated through any suitable manner and may be stored securely such that unauthorized entities are not provided access to the private key. In some embodiments, the private key may be stored in a local memory or in a remote secured database. In some embodiments, the private key may be one of a private/public key pair associated with the merchant processor computer 130 and the public key may be provided to the master applet 112 for use in a remote transaction. Additionally, in some embodiments, the master applet key database 131 may include one or more symmetric encryption keys that may be used where data is encrypted using a symmetric encryption key instead of public/private encryption key pair. In some embodiments, the master applet key database 131 may store the master wallet decryption keys by a mobile application identifier that identifies the mobile application 111 associated with an encrypted message. Any other relevant information may be used to identify a relevant master wallet decryption key for a transaction.

The registered application key database 132 may comprise one or more decryption keys associated with one or more applications registered with the merchant processor computer 130. For example, the registered application key database 132 may include decryption keys associated with payment applications and/or wallet applications that have performed an on-boarding or registration process with the merchant processor computer 130. Thus, the payment applications and/or wallet applications may have obtained one or more encryption keys that are configured to be used for transactions involving the master applet 112. In some embodiments, the registered application key database 132 may store the application decryption keys by an application identifier that identifies the payment application or wallet application associated with an encrypted message. Any other relevant information that identifies a selected application may be used to identify a relevant application decryption key for a transaction.

Accordingly, the merchant processor computer 130 may be configured to facilitate secure remote payment transactions using at least two different registered decryption keys. A first key associated with a master applet encryption key that is used to decrypt a message payload in order to obtain payment application and/or wallet application encrypted credentials and a second decryption key associated with the registered payment/wallet application that is used to decrypt the encrypted credentials. Thus, the merchant processor computer 130 provide a single integration point for mobile applications to quickly and easily integrate a variety of different payment processes, payment/wallet applications, and provide a variety of choices to consumers without requiring extensive development by the mobile application developer.

II. Exemplary Methods for Processing Transactions Using a Master Applet

Figure 3:
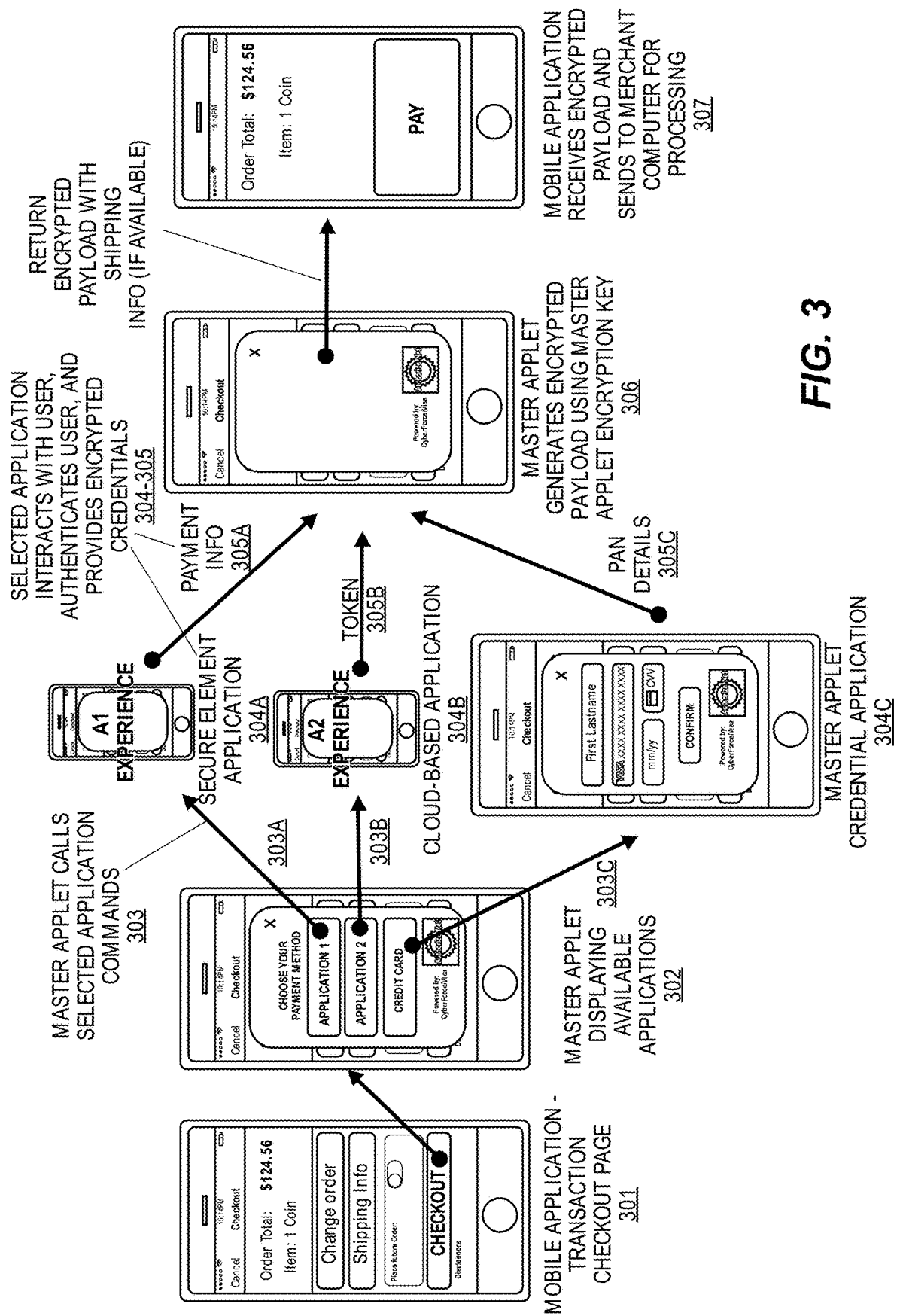
FIG. 3 shows a variety of graphical user interfaces of an exemplary mobile device during various steps of an application selection process performed by a user interacting with a master applet, according to an exemplary embodiment of the present invention.

FIGS. 3-4 show two viewpoints of exemplary methods for processing a secure remote transaction using a master applet 112, according to an embodiment of the present invention. In some embodiments, the master wallet may be referred to as a "master wallet applet" where the master applet 112 is interfacing with multiple payment applications and/or wallet applications. For example, FIG. 3 shows a variety of graphical user interfaces of an exemplary mobile device 110 during various steps of an application selection process performed by a user interacting with a master wallet applet. Further, FIG. 4 shows the application selection process as well as a remote transaction processing flow through an exemplary remote transaction processing system using a master wallet applet.

A. Exemplary Method of Selecting an Application Using a Master Applet

FIG. 3 shows a series of exemplary mobile device 110 graphical user interfaces showing the interaction of the mobile application 111 and the master applet 112 that allows for integration of multiple payment and/or wallet applications for processing a remote transaction using the mobile application 111. The various payment and/or wallet applications may have different consumer authentication processes, different credentials stored, may be processed by different payment networks, and may allow for flexibility by a mobile application 111 in providing a variety of payment options and experiences to mobile device users. Before the process shown in FIG. 3 begins, a user of the mobile device 110 may use a mobile application 111 installed on the mobile device 110 to shop for available products or services from a merchant. For example, the mobile application 111 may be a merchant application that is in communication with a merchant server computer that delivers products, prices, availability, etc. for consumer purchasing through the mobile device 110. Once the user determines the available products they would like to purchase, the consumer may be taken to a shopping cart or other transaction summary page that allows the transaction process to begin.

At step 301, a mobile application 111 operating on the mobile device 110 is displaying a checkout page with transaction information. If the user agrees to the terms of the transaction, the consumer may enter checkout or press the checkout button in order to initiate a transaction to purchase the products. Once the consumer enters the checkout button, the mobile application 111 may call a master applet (e.g., a master wallet applet) in order to obtain account credentials for the transaction. The master wallet applet may determine the available payment and/or wallet applications on the mobile device 110.

The master wallet applet may have previously determined the available applets by performing a search for relevant payment and/or wallet applications installed on the mobile device 110 or may perform a search in response to the call from the mobile application 111. The master wallet applet may search for available wallet applets by searching a log of registered applications present on the mobile device 110 or through any other suitable manner. For example, the master wallet applet may have a list of application identifiers associated with payment applications and wallet applications that have registered with a provider of the master applet computer (e.g., a merchant processor). Thus, the master wallet may search for known application identifiers, file directories, and/or any other relevant information to determine which payment and/or wallet applications are present on the mobile device 110. The master wallet may search for registered payment and wallet applications because the master wallet may select those registered applications that are associated with previously registered decryption keys stored by a computer associated with the master wallet applet such that the account credentials may be decrypted and a transaction may be processed using the selected application.

At step 302, the master wallet applet determines the available payment and/or wallet applications and displays the available applications 113A-113N to a user of the mobile device 110. The available payment and/or wallet applications 113A-113N may include any number of different available registered applications 113A-113N that may be presented for selection by a user. For example, the applications 113A-113N may be provided by different issuers, payment processing networks, digital wallet providers, merchants, and/or any other interested parties and may allow a consumer to add account credentials to the applications 113A-113N and use the account credentials to initiate transactions. The various applications may use different types of credentials, may obtain their credentials from different sources (e.g., a secure element, a remote server computer, a general purpose memory, etc.) and may have different user authentication/verification processes. Thus, each of the available applications may be associated with a different payment method including different user verification processes and different encrypted credentials. For example, each payment/wallet application may have a different password associated with the user. Further, each payment/wallet application may have a different method of verifying a user. For instance, one wallet application may use a biometric authentication procedure (e.g., fingerprint verification) while another wallet application may use a personal identification number (PIN). As shown in steps 303-305, each of the applications may have their own user experience, encrypted credentials, and verification processes for processing a transaction.

At step 303, a user selects a presented available application and the master wallet applet determines the relevant commands for obtaining account credentials from the selected application. For example, as shown in FIG. 3, the master wallet applet may determine that there are three different available wallet applications available on the mobile device 110. For instance, the mobile device 110 may include a secure element wallet application that may store credentials on a secure element of the mobile device 110, a cloud-based payment application that may obtain credentials from a remote server computer, and a master applet credential application that allows a user to obtain credentials from a user by entering the credentials into the master applet 112 in order to initiate a transaction.

For example, in FIG. 3, there are three available payment methods presented to a user. The user may select any of the available methods (and associated applications) and the master applet 112 may determine the appropriate commands and/or APIs associated with the selected application. The master applet 112 may then call the appropriate commands associated with the selected application in order to obtain payment credentials from the selected application. For instance, if the user selects the secure element application, the master applet 112 may determine an appropriate command for obtaining credentials from the secure element application, determine an appropriate authentication token associated with the secure element application, and may make a "call" to obtain the credentials associated with the secure element application. The call or API command may include any information that the secure element application may use to authenticate the master applet 112 and provide the credentials. In some embodiments, the commands for obtaining credentials from different applications may be different and may be provided to the master applet 112 during registration of the application with the merchant processor computer 130.

At step 304, the payment application may perform a traditional payment experience as designed by the application. For example, each payment application may have a different authentication and/or validation process for the user. Additionally, different application displays, steps, and experiences may be provided based on the application selected by the user. Accordingly, each payment application may provide a unique and customizable user interaction and user authentication process. For example, where the selected application is a wallet application, the wallet application may provide a user with the available account options for different accounts to use in processing the transaction.

A user may perform any authentication and/or account selection processes through the selected application and the selected application may obtain the selected account credentials from the appropriate location. For example, using the example provided above, if the user selected the secure element application 304A, the secure element application may determine the available account credentials based on stored account credentials provisioned or stored on the secure element of the mobile device 110 and may present the available account credentials for the user's selection. The secure element application may provide a particular user experience, consumer authentication process (e.g., ask for a particular password associated with the secure element payment application), and perform any other application-specific process to provide the traditional payment experience for the user associated with the secure element application. The user may complete these processes and the secure element credential application may obtain the selected credentials from the secure element if the user is authenticated.

In some embodiments, the master applet 112 may provide an option for the consumer to enter account credentials into the master applet 112 and thus, the master applet 112 may act as a payment application. For example, a user may be provided with a credit card option that allows the user to enter account credentials into the master applet 112. The master applet 112 may then provide a user interface to accept account credentials from the user. Thus, in such embodiments, the master applet 112 may determine commands for the input of account credentials into the master applet interface and may not interface with a third party payment application or other third party API. Thus, the master applet 112 may also include payment application functionality as well as functionality for interfacing with other payment applications.

At step 305, the master applet 112 obtains encrypted credentials from the selected application. The selected application may obtain the encrypted credentials through any suitable method depending on the type of payment application and how the payment application stores the credentials. For example, the secure element application may obtain the credentials from a secure memory. The credentials may be stored encrypted or the selected application may encrypt the credentials with an application encryption key when providing the credentials from the secure memory to the master applet 112. However, the cloud-based application may obtain the credentials from a remote server computer that stores the encrypted credentials and sends them in response to a request from the cloud-based application. Further, as described above, the master applet credential application may obtain the credentials from user input. The master applet credential application may encrypt the received credentials using an encryption key associated with the master applet 112 that has a registered decryption key stored at the merchant processor computer 130.

Additionally, the credentials may include different types of information depending on the type of payment application. For example, the secure element application may store an account identifier (e.g., a PAN) because the secure element includes secure hardware while the cloud-based application may include a token or account substitute that may be exchanged for an account identifier during transaction processing. For example, a relationship between a token and an account identifier may be stored in a token vault at the payment processing network computer which exchanges the token for the associated account identifier before sending an authorization request message to an issuer for transaction authorization.

Whether the selected application applies an encryption key to the credentials or the credentials are stored encrypted, the credentials may be returned to the master applet 112 as encrypted credentials. Transaction information such as shipping information, consumer information, product information, etc. may also be returned to the master applet 112 encrypted or in clear text. Accordingly, the master applet 112 may obtain payment data (with at least the credentials encrypted) from the selected applet.

At step 306, the master applet 112 may encrypt the received consumer information, transaction information, and account credentials into a single transaction payload using a master applet encryption key. The encrypted payload may only be decrypted by a computer associated with the master applet 112 (e.g., a merchant processor computer 130). Accordingly, in some embodiments, the master applet 112 may encrypt the payment data and transaction data into an encrypted payload using a merchant processor encryption key.

At step 307, the master applet 112 returns the encrypted payload including the encrypted credentials and the transaction information to the mobile application 111. The mobile application 111 may be configured to communicate with a merchant computer 120 (e.g., merchant web server) associated with the mobile application 111 to process a transaction. Thus, the mobile application 111 may obtain the encrypted payload from the master applet 112 and may send the encrypted payload to a merchant computer 120 associated with the mobile application 111.

The merchant web server 120 may then pass the encrypted payload to the merchant processor computer 130 associated with the master applet 112 for processing. The merchant processor computer 130 may use on-boarded or registered encryption keys associated with the master applet 112 to decrypt the encrypted payload. In some embodiments, the particular master applet decryption key used to decrypt the payload may be based on a merchant identifier and/or mobile application identifier associated with the master applet 112 and the mobile application 111 originating the transaction. Once the encrypted payload is decrypted, the merchant processor may use registered decryption keys associated with the selected application (e.g., a selected payment method or wallet), in order to decrypt the transaction payload and forward for processing to a payment network. Accordingly, the master wallet applet 112 may determine the payment applications that are available to a mobile application 111, provide a uniform display for a user to select which payment method they would like to use, and complete the payment process on behalf of the merchant.

B. Exemplary Method of Processing a Transaction Using a Selected Application Through a Master Applet FIG. 4 shows a flow diagram for a method of processing a transaction using a selected application through a master applet 112 where the user selects a third party wallet application for the transaction. Before the flow diagram shown in FIG. 4 begins, a user may shop for products or services through a mobile application 111 installed on their mobile device 110 which may communicate with the merchant computer 120 to obtain available products, prices, etc.

At step 401, a mobile application 111 obtains transaction information from a merchant computer 120 associated with a mobile application 111 in response to a request to checkout or complete their transaction through the mobile application 111. The transaction information may include a transaction amount, a shipping address, a merchant identifier associated with the merchant computer 120, and any other relevant information.

At steps 402-412, the process proceeds through similar steps to those described above in steps 301-307 of FIG. 3. However, for the sake of clarity, these steps may be briefly described below. Additional details may be obtained from FIG. 3 above.

At step 402, the user selects checkout and the mobile application 111 calls the master applet 112 functionality in order to obtain credentials for the transaction. The mobile application 111 may provide the transaction data and any mobile application restrictions to the master applet 112.

At step 403, the master applet 112 may determine available payment methods for a mobile device 110 associated with the mobile application 111. For example, the master applet 112 may search the mobile device 110 for installed and available payment applications that have been registered with the master applet 112. If restrictions on the payment and/or wallet applications that can be selected by the user are provided by the mobile application 111, the master applet 112 may use the restrictions to limit the available applications allowed for the transaction. For example, if the mobile application 111 does not allow a particular wallet application to be used (e.g., an unsecure wallet application, an unauthorized wallet application, a competitor's wallet application, etc.) the master applet 112 may not provide the unauthorized application as an available application for the transaction.

At step 404, the master applet 112 provides the available applications to the mobile application 111 for display to the user. The master applet 112 may provide a separate display overlaying the mobile application images or may pass the information to the mobile application 111 to display through the mobile application interface. In some embodiments, the master applet 112 may not pass the available applets back to the mobile application 111 and instead, may provide the list of available applications to the user for selection.

At step 405, the mobile application 111 displays the available applications and the user selects one of the available applications for payment.

At step 406, the mobile application 111 provides the user selected application indication to the master applet 112. The mobile application 111 may identify the selected application to the master applet 112 through any suitable method.

At step 407, the master applet 112 determines a set of commands associated with the selected application. For example, the master applet 112 may determine a set of API commands for the selected application and may determine an API command for obtaining credentials associated with the payment application. For example, the master applet 112 may determine a credential request command and any information requested by the mobile application 111 for the credential request. For instance, a mobile application 111 may request transaction information with the request so that a cryptogram and/or transaction dependent information may be generated for the transaction. As an example, a dynamic card verification value that is generated using the transaction amount may be generated for the transaction but the payment application may request the transaction amount in the credential request in order to generate the appropriate cryptogram.

At step 408, the master applet 112 sends the credential request command associated with the selected application to the selected application. For example, the credential request may include a merchant identifier and transaction data to the selected application to allow the payment application to generate and/or obtain the account credentials.

At step 409, the selected payment application may perform an account selection, user authentication, and credential retrieval process for the selected account. The selected payment application may perform any proprietary or application-specific processes associated with the application and the consumer may interact with the selected application to obtain the credentials. Further, in some embodiments, the selected payment application may interface with the consumer through the master applet 112 such that the interface is uniform with the consumer during the transaction process.

At step 410, the master applet 112 receives a credential response associated with the selected application that includes the encrypted credentials. The payment application may encrypt the credentials using an application-specific encryption key and may provide the encrypted credentials to the master applet 112 with an application identifier that may allow a processing computer to determine which payment application the encrypted credentials are associated with.

At step 411, the master applet 112 receives the encrypted credentials and generates an encrypted payload for the transaction. The master applet 112 may generate the encrypted payload by using a master apple encryption key stored by the master wallet and using the encryption key to encrypt any sensitive information associated with the transaction. The encrypted payload may include the encrypted credentials, transaction information, the application identifier, and any other relevant information to the transaction.

At step 412, the master applet 112 may send the encrypted payload to the mobile application 111 for delivery to a merchant computer 120 associated with the mobile application 111 for transaction processing. In some embodiments, the master applet 112 may include a master applet indicator with the encrypted payload to allow the mobile application 111 and the merchant computer 120 to determine that the payload is encrypted by the master applet 112 and that the transaction information should be directed to a computer configured to process master applet transactions. For example, the master applet indicator may include a flag, a master wallet identifier, and/or any other relevant information that identifies the type of transaction information being provided to the mobile application 111.

At step 413, the mobile application 111 may pass the encrypted payload to a merchant computer 120 associated with the mobile application 111. The mobile application 111 may be configured to communicate with a single merchant computer 120 and/or numerous merchant computers. Thus, in some embodiments, the mobile application 111 may determine the appropriate merchant application based on the transaction information associated with the transaction.

At step 414, the merchant computer 120 receives the transaction request including the encrypted payload and determines the type of transaction being received. For example, the merchant computer 120 may use the master applet indicator included in the transaction request to determine that the encrypted payload should be forwarded to a merchant processor computer 130 associated with the merchant application. In other embodiments, the merchant computer 120 may forward all transaction requests to the merchant processor as part of e-commerce transaction processing. Either way, the merchant computer 120 forwards the encrypted payload to the merchant processor computer 130.

At step 415, the merchant computer 120 determines the appropriate merchant processor and passes the encrypted payload to the merchant processor for decryption and payment processing.

At step 416, the merchant processor server computer receives the forwarded transaction request including the encrypted transaction payload and determines an appropriate decryption key associated with the transaction request. In some embodiments, the merchant processor computer 130 may use the master applet identifier, a mobile application identifier, a merchant computer identifier, or any other information associated with the transaction request to determine the appropriate decryption key associated with the master applet encryption key. For instance, in some embodiments, the master applet 112 may use different encryption keys for different mobile applications, merchant computers, and/or any other variables associated with the transaction. Accordingly, the merchant processor computer 130 may determine the associated master applet decryption key stored in a master applet key database 131 for the transaction payload. For instance, the merchant processor may search the master applet key database 131 for a master applet key associated with a merchant identifier or mobile application identifier in order to determine the appropriate decryption key for the transaction payload.

Once the merchant processor computer 130 obtains the appropriate decryption key from the master applet key database 131, the merchant processor may decrypt the encrypted payload using the merchant processor encryption key. The merchant processor encryption key may be associated with the particular mobile application 111 being used or may be general key that is known only to the merchant processor. For example, the master wallet encryption key and the master wallet decryption key may be specific to the mobile application 111 in which the transaction is being initiated.

Thus, the merchant processing computer may decrypt the encrypted payload to obtain the encrypted credentials and transaction data. Since the payload was encrypted during transmission from the mobile device 110 to the merchant computer 120 and subsequently to the merchant processor computer 130, the transaction information may be secured against malicious third parties intercepting the information included in the payload. However, the merchant processing computer may still not initiate a transaction because the account credentials are encrypted and thus, the merchant processing computer may not know which payment processing network 150 and/or issuer 160 is associated with the encrypted credentials.

At step 417, the merchant processor computer 130 determines an encryption key associated with the encrypted credentials by parsing the application identifier from the decrypted payload, searching a registered application key database 132 for a decryption key associated with a selected application identifier associated with the selected payment application identifier, and obtaining the decryption key from the registered application key database 132. The selected application identifier may include any relevant information. For example, the selected application identifier may include a wallet identifier associated with a selected payment/wallet application used to encrypt the credentials. Further, in embodiments where the master applet 112 obtains credentials from a consumer through the master applet interface, the application identifier may include a master wallet identifier and the key may be the same as the previous master applet decryption key or may be a separate decryption key associated with the master applet 112.

Thus, the encrypted account credentials obtained from the selected wallet application may be encrypted with an application-specific encryption key. As such, the application provider and/or the merchant may register the application-specific key (and/or a corresponding decryption key) with the merchant processor in order for the account credentials to be decrypted once they are at the merchant processor server computer 130. Therefore, once the account credentials and transaction data is decrypted using the associated decryption key, the merchant processor computer 130 may have decrypted account credentials and transaction data from the mobile device 110 for the transaction.

At step 418, the merchant processor computer 130 may initiate a transaction using the decrypted credentials and transaction data. The merchant processor computer 130 may initiate a transaction by generating an authorization request message including the decrypted credentials and the transaction data and sending the authorization request message for processing by a payment network. For example, the merchant processor computer 130 may send the authorization request message to an acquirer computer 140 associated with the merchant. The authorization request message may include the decrypted account credentials and the transaction data mapped to predetermined fields within the authorization request message in order to allow transaction entities within the transaction ecosystem to identify an account and process the transaction.

At step 419, the acquirer computer 140 may receive the authorization request message and may route the authorization request message to a payment processing network computer 150 associated with an issuer identifier (e.g., a BIN) or account identifier (e.g., primary account identifier) provided in the authorization request message.

At step 420, the payment processing network 150 receives the authorization request message, determines an account issuer associated with the account credentials included in the authorization request message, and forwards the authorization request message to the issuer computer 160.

At step 421, the issuer computer 160 may perform a risk assessment and authorization decisioning process where the issuer computer 160 may parse the relevant information from the authorization request message including any validation information from the payment processing network 150 related to the transaction (e.g., a risk score, etc.) and may make a decision regarding whether the transaction is authorized.

At steps 422-425, the issuer computer 160 may generate and return an authorization response message including an indication as to whether the transaction is authorized back through the payment network and ultimately to the merchant computer 120 and the consumer (through the mobile device 110) as to whether the transaction is authorized and is successfully completed. For example, the merchant processor computer 130 may receive the authorization response message from the acquirer computer 140 and may forward the authorization response message to the merchant computer 120. The merchant computer 120 may then forward the authorization response message to the mobile application 111 with receipt information and confirmation of the authorization decision. Thus, the transaction may be completed. Accordingly, the master applet 112 may integrate with any number of payment processing methods and may provide a more flexible payment experience while maintain security throughout the payment process.

III. System Devices

Figure 5:
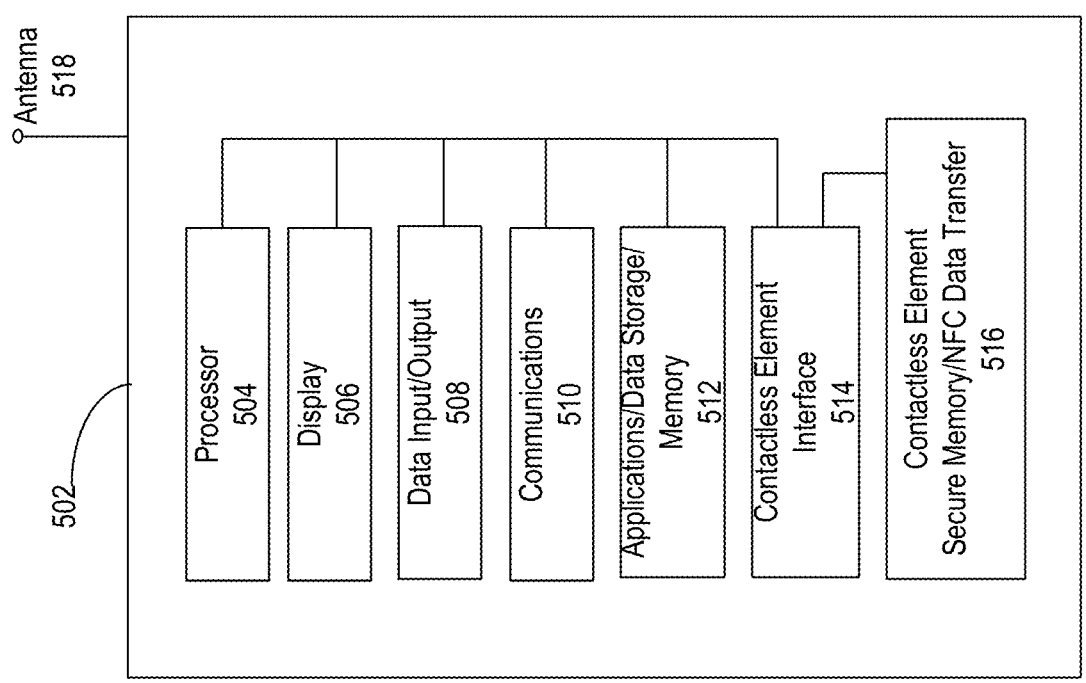
FIG. 5 illustrates a block diagram of a mobile device.

FIG. 5 is a functional block diagram illustrating a portable communication device 502 that may be used to perform mobile banking operations, such as initiating transactions and receiving and displaying transaction alerts, in accordance with some embodiments of the present invention. Portable communication device 502 may include circuitry that is used to enable certain device functions, such as telephony. The functional elements responsible for enabling those functions may include a processor 504 that is programmed to execute instructions that implement the functions and operations of the device. Processor 504 may access data storage 512 (or another suitable memory region or element) to retrieve instructions or data used in executing the instructions. Data input/output elements 508 may be used to enable a user to input data (via a microphone or keyboard, for example) or receive output data (via a speaker, for example). Display 506 may also be used to output data to a user. Communications element 510 may be used to enable data transfer between device 502 and a wireless network (via antenna 518, for example) to assist in enabling telephony and data transfer functions. Device 502 may also include contactless element interface 514 to enable data transfer between contactless element 516 and other elements of the device, where contactless element 516 may include a secure memory and a near field communications data transfer element (or another form of short range communications technology). As noted, a mobile phone or similar device is an example of a portable communication device that may be used to display alerts as described with reference to embodiments of the present invention. However, other forms or types of devices may be used without departing from the underlying concepts of the invention. Further, devices that are used to display alerts may not require the capability to communicate using a cellular network in order to be suitable for use with embodiments of the present invention.

Figure 6:
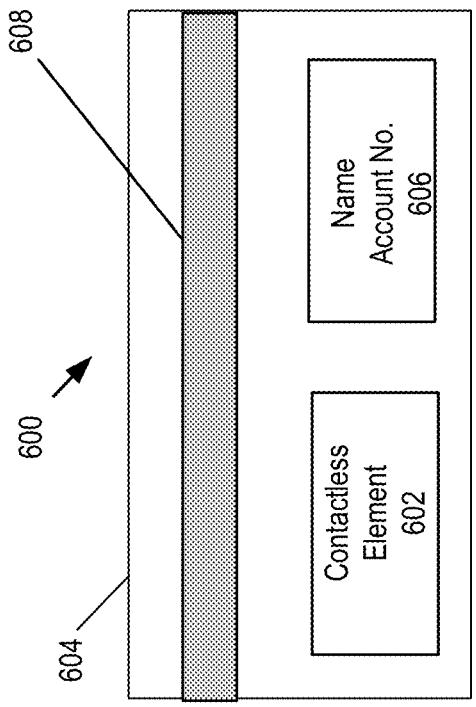
FIG. 6 illustrates a block diagram of a portable consumer device.

FIG. 6 is a diagram of a portable consumer device 600 in the form of a card that includes a contactless payment element 602, and that may be used to initiate a transaction, in accordance with some embodiments of the present invention. The payment device depicted in FIG. 6 may be a "smart card" or similar device, such as a credit or debit type card in which a chip is embedded. One form of such a device is known as an EMV (Europay™, MasterCard™ and Visa™) card. In the context of the present invention, EMV refers to a standard for interoperation of IC cards ("chip cards") and integrated chip (IC) card capable point-of-sale (POS) terminals and ATMs, and is used for authenticating credit and debit card payments. The EMV standard defines the interactions at the physical, electrical, data and application levels between IC cards and IC card processing devices for use in financial transactions.

FIG. 6 shows a substrate 604 that provides the form factor for device 600. A contactless element 602 for interfacing with a data access or data transfer device may be present on, or embedded within, substrate 604. Contactless element 602 may include a chip or other form of data storage element. Contactless element 602 may include the capability to communicate and transfer data using a near field communications (NFC) technology or other short range communications technology. Consumer information 606 such as an account number, expiration date, and consumer name may be printed or embossed on the card. Although not necessary for operation as a contactless payment device, device 600 may include a magnetic stripe 608 on substrate 604, where magnetic stripe 608 permits access to contactless element 602. This may be used to provide access to data stored in, or the functions of, the chip that is part of the contactless element by a terminal using a magnetic stripe reader.

Figure 7:
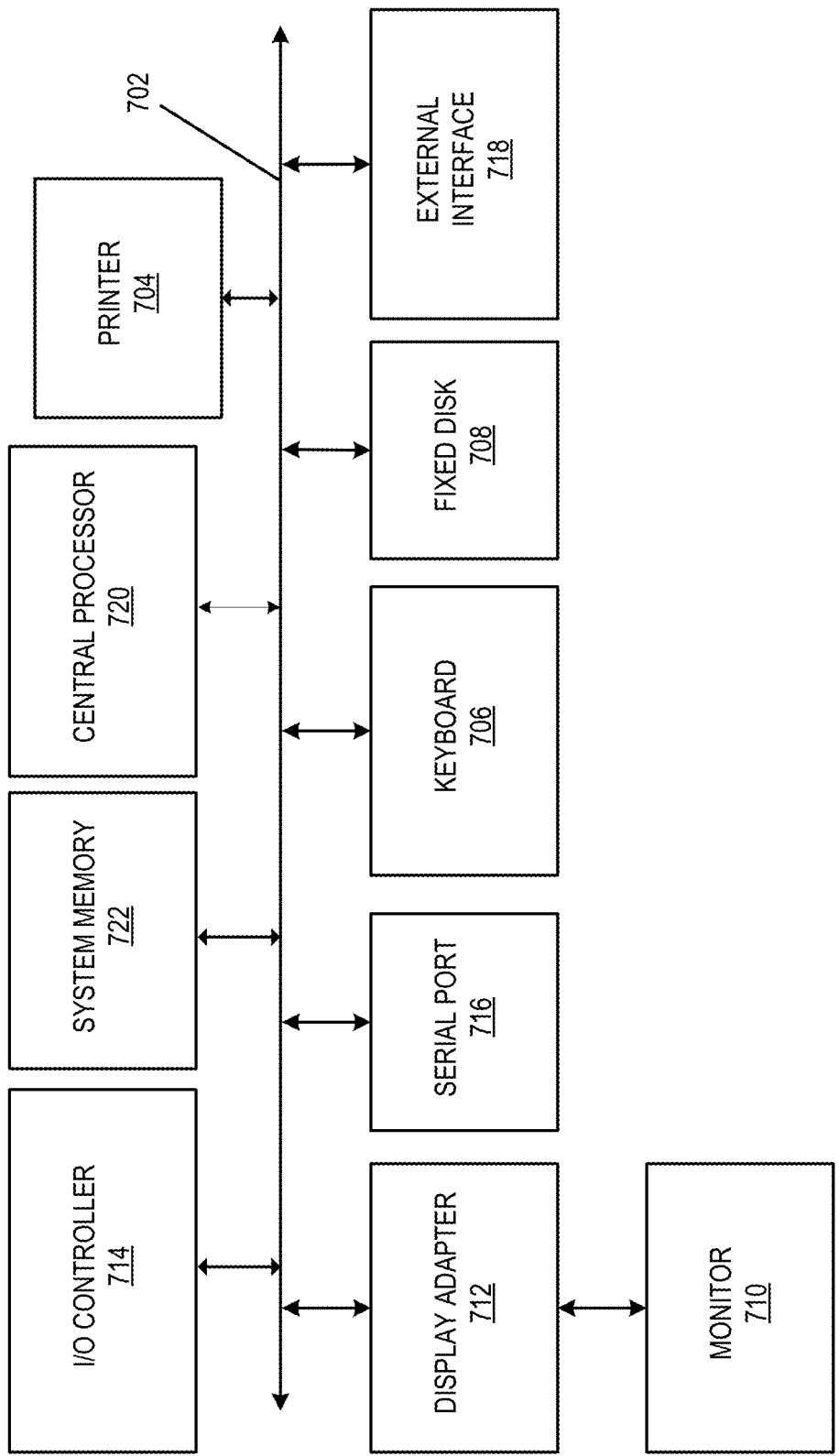
FIG. 7 illustrates a block diagram of a computer apparatus.

The various participants and elements shown in FIGS. 1-4 may operate one or more computer apparatuses (e.g., a server computer) to facilitate the functions described herein. Any of the elements in FIGS. 1-4 may use any suitable number of subsystems to facilitate the functions described herein. Examples of such subsystems or components are shown in FIG. 7. The subsystems such as a printer 704, keyboard 706, fixed disk 708 (or other memory comprising computer readable media), monitor 212, which is coupled to a display adapter 712, and others are shown. Peripherals and input/output (I/O) devices, which couple to I/O controller 714, can be connected to the computer system by any number of means known in the art, such as serial port 716. For example, serial port 716 or external interface 718 can be used to connect the computer apparatus to a wide area network such as the Internet, a mouse input device, or a scanner. The interconnection via system bus allows the central processor 720 to communicate with each subsystem and to control the execution of instructions from system memory 722 or the fixed disk 708, as well as the exchange of information between subsystems.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It should be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   determining, by a master applet associated with a mobile application, a plurality of available applications on a mobile device, each available application of the plurality of available applications having a different application programming interface (API);
   displaying, by the master applet, the plurality of available applications to a user;
   receiving, by the master applet, a selection of one of the plurality of available applications from the user;
   determining, by the master applet, an API for the selected application;
   determining, by the master applet, a credential request command based on the API;
   sending, by the master applet, the credential request command to the selected application;
   obtaining, by the master applet, encrypted credentials from the selected application;
   generating, by the master applet, an encrypted payload by encrypting a payload including the encrypted credentials and transaction data, wherein the payload is encrypted using a master applet encryption key associated with the master applet; and
   sending the encrypted payload to a processor computer that decrypts the encrypted payload using a master applet decryption key, decrypts the encrypted credentials using a selected application decryption key to obtain decrypted credentials, and uses the decrypted credentials and the transaction data to initiate a transaction.

2. The method of claim 1, wherein each of the plurality of available applications is associated with a different payment method including different user verification processes and different encrypted credentials.

3. The method of claim 1, wherein credentials of the encrypted credentials are encrypted by the selected application using an encryption key associated with the selected application.

4. The method of claim 1, wherein the master applet encryption key and the master applet decryption key are specific to the mobile application and wherein the master applet encryption key and the master applet decryption key are determined using a mobile application identifier associated with the mobile application.

5. The method of claim 1, wherein one of the plurality of available applications includes the master applet, and wherein obtaining encrypted credentials from the selected application comprises:
receiving, by the master applet, credentials from the user; and
encrypting, by the master applet, the credentials using an encryption key associated with the master applet.

6. The method of claim 1, wherein the encrypted payload includes a selected application identifier and wherein the selected application decryption key is determined by the processor computer by searching a registered application key database for the selected application identifier.

7. The method of claim 1, wherein determining the plurality of available applications on the mobile device comprises:
searching, by the master applet, for registered applications present on the mobile device, wherein the registered applications are associated with previously registered application decryption keys stored by the processor computer.

8. The method of claim 1, wherein the encrypted credentials are stored by a remote server computer and the selected application obtains the encrypted credentials from the remote server computer.

9. The method of claim 1, wherein sending the encrypted payload to the processor computer comprises:
sending the encrypted payload and a master applet indicator to a remote computer associated with the mobile application, wherein the remote computer uses the master applet indicator to determine that the encrypted payload should be forwarded to the processor computer, and wherein the remote computer forwards the encrypted payload to the processor computer.

10. The method of claim 1, further comprising:
subsequently, receiving a selection of a second application of the plurality of available applications from the user for a second transaction;
obtaining, by the master applet, second encrypted credentials from the second application; and
generating, by the master applet, a second encrypted payload by encrypting a second payload including the second encrypted credentials and second transaction data, wherein the second payload is encrypted using the master applet encryption key associated with the master applet.

11. A system comprising:
a mobile device comprising a master applet associated with a mobile application, the master applet being configured to:
determine a plurality of available applications on the mobile device, each available application of the plurality of available applications having a different application programming interface (API);
display the plurality of available applications to a user;
receive a selection of one of the plurality of available applications from the user;
determining, by the master applet, an API for the selected application;
determining, by the master applet, a credential request command based on the API;
sending, by the master applet, the credential request command to the selected application;
obtain encrypted credentials from the selected application;
generate an encrypted payload by encrypting a payload including the encrypted credentials, an application identifier, and transaction data, wherein the payload is encrypted using a master applet encryption key, wherein the application identifier indicates that the encrypted credentials were obtained from the selected application; and
send the encrypted payload and an unencrypted indicator to a computer, wherein the unencrypted indicator indicates that the encrypted payload originated from the master applet; and
the computer configured to:
receive the unencrypted indicator and the encrypted payload including the encrypted credentials, the application identifier, and the transaction data;
decrypt the encrypted payload using a decryption key associated with the master applet to obtain the encrypted credentials, the application identifier, and the transaction data;
use the application identifier to search a database for a decryption key associated with the encrypted credentials;
decrypt the encrypted credentials using the decryption key associated with the encrypted credentials; and
initiate a transaction using the decrypted credentials and the transaction data.

12. The system of claim 11, wherein the computer is a processor computer, and wherein the system further comprises:
a mobile application computer associated with the mobile application operating on the mobile device, the mobile application computer being configured to:
receive the encrypted payload and a master applet indicator from the mobile device;
determine that the encrypted payload should be forwarded to the processor computer using the master applet indicator; and
forward the encrypted payload and the master applet indicator to the processor computer.

* * * * *